US006292884B1

(12) United States Patent
Tran et al.

(10) Patent No.: US 6,292,884 B1
(45) Date of Patent: *Sep. 18, 2001

(54) REORDER BUFFER EMPLOYING LAST IN LINE INDICATION

(75) Inventors: Thang M. Tran; David B. Witt, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/476,388

(22) Filed: Dec. 30, 1999

Related U.S. Application Data

(63) Continuation of application No. 09/078,213, filed on May 13, 1998, now Pat. No. 6,032,251, which is a continuation of application No. 08/803,093, filed on Feb. 20, 1997, now Pat. No. 5,768,555.

(51) Int. Cl.$^7$ .......................................................... G06F 9/30
(52) U.S. Cl. ........................... 712/216; 712/23; 712/214; 712/215; 712/217; 712/218
(58) Field of Search ..................................... 712/216, 217, 712/218, 214, 215, 23

(56) References Cited

U.S. PATENT DOCUMENTS

| 4,044,338 | 8/1977 | Wolf . |
| 4,453,212 | 6/1984 | Gaither et al. . |

(List continued on next page.)

FOREIGN PATENT DOCUMENTS

| 0259095 | 3/1988 | (EP) . |
| 0381471 | 8/1990 | (EP) . |

(List continued on next page.)

OTHER PUBLICATIONS

XP–000751757, "The Alpha 21264: A 500 MHz Out–of–Order Execution Microprocessor," Daniel Leibholz and Rahul Razdan, Digital Equipment Corp. Hudson, MA IEEE, 1997, pp. 28–36.
Intel, "Chapter 2: Microprocessor Architecture Overview," pp. 2–1 through 2–4.
Slater, "AMD's K5 Designed to Outrun Pentium," Microprocessor Report, vol. 8, No. 14, Oct. 24, 1994.
Rupley et al., "P6: The Next Step?," PC Magazine, Sep. 12, 1995.
Halfhill, "AMD K6 Takes on Intel P6," BYTE, Jan. 1996.

*Primary Examiner*—Meng-Al T. An
*Assistant Examiner*—Nabil El-Hady
(74) *Attorney, Agent, or Firm*—Conley, Rose & Tayon, PC; Lawrence J. Merkel

(57) ABSTRACT

A reorder buffer is provided which stores a last in buffer (LIB) indication corresponding to each instruction. The last in buffer indication indicates whether or not the corresponding instruction is last, in program order, of the instructions within the buffer to update the storage location defined as the destination of that instruction. The LIB indication is included in the dependency checking comparisons. A dependency is indicated for a given source operand and a destination operand within the reorder buffer if the operand specifiers match and the corresponding LIB indication indicates that the instruction corresponding to the destination operand is last to update the corresponding storage location. At most one of the dependency comparisons for a given source operand can indicate dependency. According to one embodiment, the reorder buffer employs a line-oriented configuration. Concurrently decoded instructions are stored into a line of storage, and the concurrently decoded instructions are retired as a unit. A last in line (LIL) indication is stored for each instruction in the line. The LIL indication indicates whether or not the instruction is last within the line storing that instruction to update the storage location defined as the destination of that instruction. The LIL indications for a line can be used as write enables for the register file.

20 Claims, 11 Drawing Sheets

U.S. PATENT DOCUMENTS

| | | |
|---|---|---|
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,710,902 | 1/1998 | Sheaffer et al. . |
| 5,764,938 | 6/1998 | White et al. . |
| 5,765,016 | 6/1998 | Walker . |
| 5,768,555 | 6/1998 | Tran et al. . |
| 5,781,790 | 7/1998 | Abramson et al. . |
| 5,805,849 | 9/1998 | Jordan et al. . |
| 5,812,812 | 9/1998 | Asfar et al. . |
| 5,870,580 | 2/1999 | Walker . |
| 5,872,951 | 2/1999 | Tran . |
| 5,878,244 | 3/1999 | Witt et al. . |
| 5,881,305 | 3/1999 | Walker . |
| 5,887,185 | 3/1999 | Lynch . |
| 5,901,302 | 5/1999 | Witt et al. . |
| 5,903,740 | 5/1999 | Walker et al. . |
| 5,903,741 | 5/1999 | Witt et al. . |
| 5,922,069 | 7/1999 | Walker . |
| 5,944,812 | 8/1999 | Walker . |
| 5,961,634 | 10/1999 | Tran . |
| 5,983,342 | 11/1999 | Tran . |
| 5,987,596 | 11/1999 | Walker . |
| 6,026,482 | 2/2000 | Witt et al. . |
| 6,032,251 | 2/2000 | Tran et al. . |

FOREIGN PATENT DOCUMENTS

| | | |
|---|---|---|
| 0459232 | 12/1991 | (EP) . |
| 2263985 | 8/1993 | (GB) . |
| 2263987 | 8/1993 | (GB) . |
| 2281422 | 3/1995 | (GB) . |
| 96/12227 | 4/1996 | (WO) . |

| Operand Specifiers | Size (3:0) | LIB (3:0) | Output Signal |
|---|---|---|---|
| Don't match | xxxx | xxxx | Deasserted |
| match | 0001 | xxx0 | Deasserted |
| match | 0001 | xxx1 | Asserted |
| match | 0010 | xx0x | Deasserted |
| match | 0010 | xx1x | Asserted |
| match | 0100 | x0xx | Deasserted |
| match | 0100 | x1xx | Asserted |
| match | 1000 | 0xxx | Deasserted |
| match | 1000 | 1xxx | Asserted |

FIG. 5A

REORDER BUFFER EMPLOYING LAST IN LINE INDICATION

This application is a continuation of U.S. patent application Ser. No. 09/078,213, filed May 13, 1998, now U.S. Pat. No. 6,032,251, issued Feb. 29, 2000, which is a continuation of U.S. patent application Ser. No. 08/803,093, filed Feb. 20, 1997, now U.S. Pat. No. 5,768,555, issued May 16, 1998.

BACKGROUND OF THE INVENTION

1. Field of the Invention

This invention relates to the field of microprocessors and, more particularly, to reorder buffers within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Generally speaking, a given instruction has one or more source operands which are input values to be operated upon by the microprocessor in response to the given instruction. Each source operand is specified by the instruction via a source operand specifier. The source operand specifier identifies a storage location which stores the corresponding source operand. In the x86 microprocessor architecture, for example, a source operand may be stored in a register or a memory location. If a source operand is stored in a register, the source operand specifier identifies one of the registers defined for the instruction set. The identified register stores the source operand. Additionally, the given instruction typically has a destination operand. The destination operand is the result of the instruction. A destination operand is stored into a location specified by a destination operand specifier, similar to the source operand specifier. It is noted that operand specifiers are sometimes referred to as operand addresses.

In order to locate a larger number of instructions which may be concurrently executed, superscalar microprocessors often employ out of order execution. If instructions are executed in order (i.e. "program order", or the order of instructions as listed in the program sequence being executed), then the number of instructions which may be concurrently executed is limited by dependencies between the instructions. A dependency exists between a first instruction and a second instruction if the second instruction receives a value produced via execution of the first instruction (the "result" of the first instruction) as a source operand. In other words, a dependency exists if the destination operand of the first instruction is the stored in the same storage location as the source operand of the second instruction. Since the second instruction needs the result of the first instruction prior to executing, the first and second instructions cannot be concurrently executed. However, an instruction subsequent to the second instruction which does not depend upon either the first instruction or the second instruction may be concurrently executed with the first instruction.

Microprocessors which implement out of order execution often employ a reorder buffer for storing speculatively generated instruction results until the corresponding instructions become non-speculative. After the corresponding instructions become non-speculative, the instruction results may be moved from the reorder buffer to the storage locations indicated by the destination operand specifiers. Generally, a particular instruction becomes non-speculative when each of the instructions which may cause an exception and which are prior to the particular instruction in program order have executed and reported no exception. Often, reorder buffers are configured to store the instruction results into the destination storage locations (i.e. retire the instructions) in program order.

Because instruction results are held in the reorder buffer and the instruction results may be source operands for subsequent instructions, reorder buffers perform dependency checking between source operands of the subsequent instructions and the instructions represented within the reorder buffer. Dependency checking is performed in order to forward the source operands (or a reorder buffer tag which identifies an instruction result corresponding to that source operand if the instruction result has not yet been generated via the execution of a prior instruction) to the execution units which receive the subsequent instructions (or to the reservation stations associated with the execution units). If a reorder buffer tag is forwarded, the execution unit monitors instruction results provided to the reorder buffer to capture, as a source operand, the instruction result corresponding to that reorder buffer tag. Generally speaking, dependency checking comprises comparing source operand specifiers of instructions to destination operand specifiers stored in the reorder buffer. If the source operand specifier and one of the destination operand specifiers indicate the same storage location, the source operand specifier and the destination operand specifier as said to match. For register operand specifiers, a match is generally detected if the operand specifiers are equal to each other.

Unfortunately, dependency checking generally involves more than a simple comparison of operand specifiers. More than one of the destination operand specifiers stored in the reorder buffer may match a particular source operand. The correct dependency is a dependency upon the instruction which is last, in program order, of the instructions for which the destination operand specifier matches the particular source operand specifier. Typically, a source operand specifier is compared to all the destination operand specifiers stored in the reorder buffer. The resulting match indications are then prioritized according to the program order of the instructions. In other words, a match indicated according to a comparison between a source operand specifier and one of the destination operand specifiers in the reorder buffer is qualified by the result of other comparisons before the corresponding reorder buffer tag or instruction result is selected for forwarding. The prioritization of matches increases the amount of time required to detect a given dependency. It is desirable to decrease the amount of time needed to perform dependency checking and to simplify the dependency checking logic.

A similar problem occurs upon retirement of instructions from the reorder buffer. Upon retirement, the instruction results corresponding to the instructions being retired are stored into the register file. Typically, the reorder buffer attempts to retire multiple instructions during a clock cycle. The destination operands of the instructions being retired are compared to each other to ensure that only one update to a given register is performed (i.e. the update corresponding to the last of the retiring instructions in program order). It is desirable to simplify the retirement logic as well.

SUMMARY OF THE INVENTION

The problems outlined above are in large part solved by a reorder buffer in accordance with the present invention. The reorder buffer described herein stores a last in buffer (LIB) indication corresponding to each instruction. The last in buffer indication indicates whether or not the corresponding instruction is last, in program order, of the instructions within the buffer to update the storage location defined as the destination of that instruction. The LIB indication is included in the dependency checking comparisons. A dependency is indicated for a given source operand and a destination operand within the reorder buffer if the operand specifiers match and the corresponding LIB indication indicates that the instruction corresponding to the destination operand is last to update the corresponding storage location. Advantageously, at most one of the dependency comparisons for a given source operand can indicate dependency. No prioritization of the dependency comparisons need be performed. Dependency checking logic may thereby be simplified via removal of prioritization logic for the comparisons with the instructions in the buffer. Removal of the prioritization logic may further lead to increased speed in performing the dependency checking.

According to one embodiment, the reorder buffer employs a line-oriented configuration. Concurrently decoded instructions are stored into a line of storage, and the concurrently decoded instructions are retired as a unit. A last in line (LIL) indication is stored for each instruction in the line. The LIL indication indicates whether or not the instruction is last within the line storing that instruction to update the storage location defined as the destination of that instruction. The LIL indications for a line can be used as write enables for the register file. Instead of comparing the destination operand specifiers for the line of instructions upon retiring the instructions, the result of interline dependency checking performed upon dispatch of the line of instructions is stored and used upon retirement of the line of instructions.

Broadly speaking, the present invention contemplates a reorder buffer comprising an instruction storage and a dependency checking unit. The instruction storage is configured to store a plurality of destination operand specifiers corresponding to a plurality of instructions. Additionally, the instruction storage is further configured to store a plurality of last in buffer indications corresponding to the plurality of instructions. Each one of the plurality of last in buffer indications is indicative, in a first state, that a corresponding one of the plurality of instructions is last, in program order, of the plurality of instructions to update a storage location identified by a corresponding one of the plurality of destination operand specifiers. Each one of the plurality of last in buffer indications is indicative, in a second state, that a first instruction within the plurality of instructions and subsequent to the corresponding one of the plurality of instructions updates the storage location. Coupled to the instruction storage and coupled to receive a source operand specifier corresponding to a second instruction subsequent to the plurality of instructions in program order, the dependency checking unit is configured to indicate a dependency between the second instruction and a particular one of the plurality of instructions if both a particular one of the plurality of destination operand specifiers corresponding to the particular one of said plurality of instructions matches the source operand specifier and a particular one of the plurality of last in buffer indications corresponding to the particular one of the plurality of instructions is in the first state.

The present invention further contemplates a method for performing dependency checking in a microprocessor. A last in buffer indication corresponding to each instruction within a reorder buffer of the microprocessor is stored. The last in buffer indication is indicative, in a first state, that a corresponding instruction is last, in program order, of the instructions in the reorder buffer to update a storage location identified by a destination operand specifier corresponding to the corresponding instruction. The last in buffer indication is indicative, in a second state, that a first instruction within the reorder buffer which is subsequent to the corresponding instruction, in program order, updates the storage location. A source operand specifier corresponding to a dispatching instruction is received in the reorder buffer. A dependency is indicated between the dispatching instruction and the corresponding instruction if both a particular last in buffer indication corresponding to the corresponding instruction is in the first state and the source operand specifier matches the destination operand specifier.

The present invention still further contemplates a microprocessor comprising a first decode unit and a reorder buffer. The first decode unit is coupled to receive a first instruction and to locate a first source operand specifier within the first instruction. Coupled to receive the first operand specifier from the first decode unit, the reorder buffer is configured to store instructions which are outstanding within the microprocessor. Additionally, the reorder buffer is configured to detect a dependency between a particular instruction within the reorder buffer and the first instruction if both the first source operand specifier matches a particular destination operand specifier corresponding to the particular instruction and a particular last in buffer indication corresponding to the particular instruction indicates that the particular instruction is last, in program order, of the instructions within the reorder buffer to update a storage location identified by the particular destination operand specifier.

BRIEF DESCRIPTION OF THE DRAWINGS

Other objects and advantages of the invention will become apparent upon reading the following detailed description and upon reference to the accompanying drawings in which:

FIG. 5A is an exemplary truth table corresponding to one embodiment of a comparator circuit shown in FIG. 5.

Figure 1:
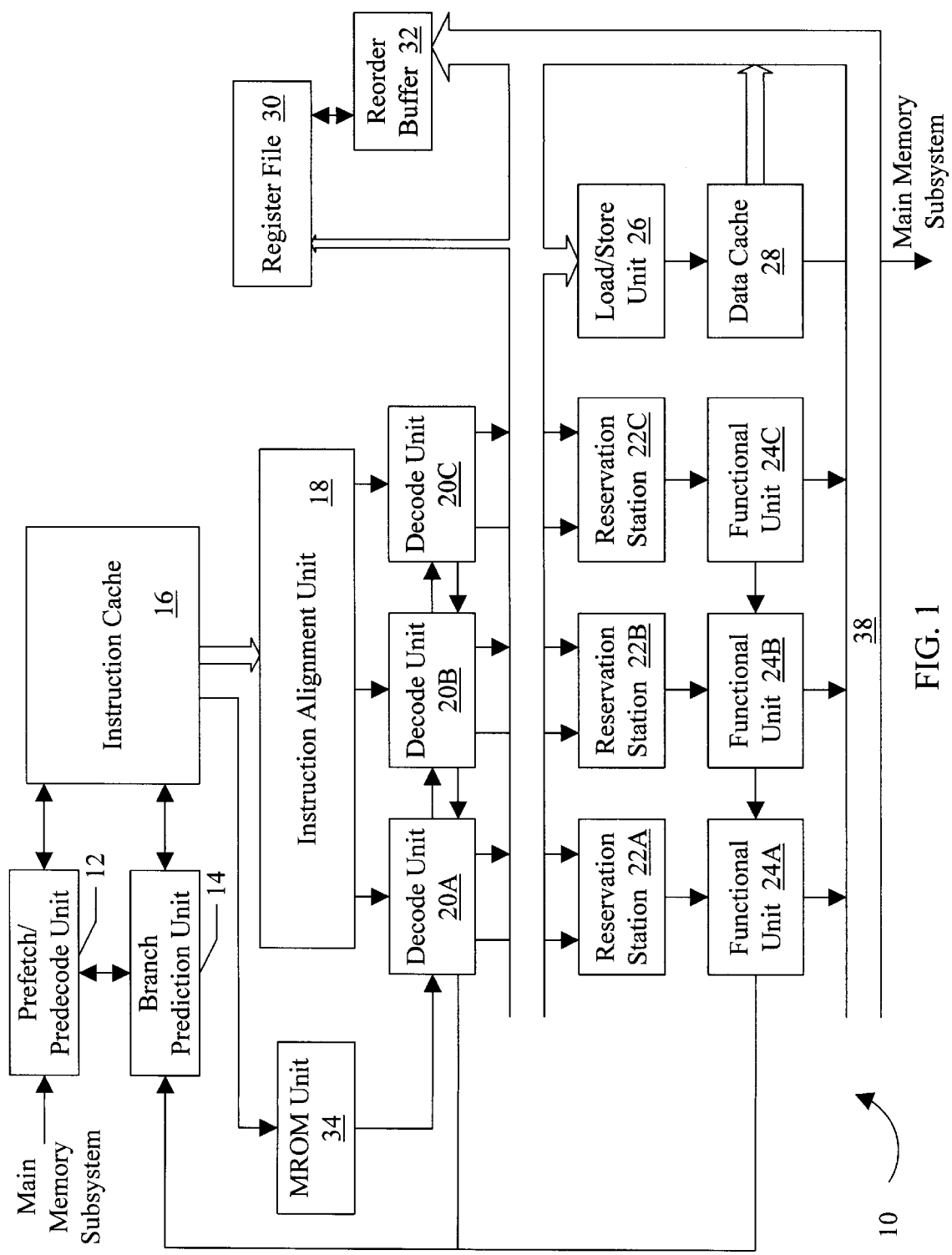
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, reorder buffer 32 is configured to store destination operand specifiers for instructions which have been decoded by decode units 20 and which have not yet been retired. Additionally, a last-in-buffer (LIB) indication is stored for each instruction. The LIB indication indicates whether or not the corresponding instruction is last, in program order, among the instructions within reorder buffer 32 to update the storage location indicated by the corresponding destination operand specifier. In a first state, the LIB indication indicates that the corresponding instruction is last, in program order to update the storage location. In a second state, the LIB indication indicates that the corresponding instruction is not last, in program order, to update the storage location (or equivalently that another instruction subsequent to the corresponding instruction is last, in program order, to update the storage location).

As decode units decode additional instructions, the operand specifiers of the additional instructions ("dispatching instructions") are presented to reorder buffer 32 for dependency checking and storage. Source operand specifiers corresponding to the dispatching instructions are compared to the destination operand specifiers stored within reorder buffer 32. Additionally, the LIB indication corresponding to each destination operand specifier is included in the comparison. The comparison indicates a dependency between a particular source operand specifier and a particular destination operand specifier if the operand specifiers match and the LIB indication is in the first state. Advantageously, at most one comparison of the particular source operand specifier to the destination operand specifiers within reorder buffer 32 indicates a match. Therefore, prioritization of the comparisons is eliminated. Instead, the prioritization is implicit in the LIB indications. Advantageously, the amount of time employed to perform dependency checking may be reduced.

In addition to comparing source operand specifiers of the dispatching instructions to the destination operand specifiers stored in reorder buffer 32, the destination operand specifiers of the dispatching instructions are compared to the stored destination operand specifiers. The result of the destination comparisons is used to update the LIB indications of the stored destination operand specifiers. If a destination operand specifier of a is dispatching instruction matches a stored destination operand specifier, the corresponding LIB indication is set to the second state. The LIB indications for the destination operand specifiers of each of the dispatching instructions are set to the first state unless two or more of the dispatching instructions update the same destination storage location, in which case the LIB indication for the last of the two or more instructions is set to the first state and the LIB indication for the others is set to the second state.

According to one embodiment, microprocessor 10 employs the x86 microprocessor architecture. As specified by the x86 microprocessor architecture, one of the source operand specifiers of the instruction is also the destination operand specifier for the instruction. This operand specifier is referred to herein as a source/destination operand specifier. Additional comparison circuitry is not needed to perform the comparisons for updating the LIB indications as described above. Instead, the comparison circuitry operating upon the source/destination operand performs a dual role of providing the dependency for the source operand and indicating the need to change the corresponding LIB indication to the second state.

Instructions may additionally use flags and may update flags according to the execution thereof. Flags are generally used to indicate characteristics of a particular result. For example, a carry flag is often employed to indicate that an ALU operation generated a carry in the result. A zero flag may also be implemented to indicate that the result is numerically zero. Other flags are employed as well. A particular instruction may have source flags and destination flags, although the source and destination flags are generally implicit in the instruction as opposed to explicitly specified in the manner of source and destination operands. Decode units 20 generate the source and destination flag specifiers while decoding the instructions, and convey the specifiers to reorder buffer 32. Reorder buffer 32 stores a flag last in buffer indication (FLIB) indication similar to the LIB indication but indicating those instructions which are last to update flags.

According to one embodiment, reorder buffer 32 comprises a line-oriented buffer. A line of storage capable of storing the maximum number of concurrently decodable instructions in microprocessor 10 is allocated each time at least one instruction is dispatched. The instructions within a line are retired concurrently as well. A set of last in line (LIL) indications are stored for the instructions within the line. The last in line indication identity the last instruction, in program order, within the line to update a given register or portion thereof. The last in line indications can be used as write enables within register file 30, eliminating the need to compare destination operand specifiers when the instructions are retired in order to generate such write enables.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect.

The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding pre-decode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
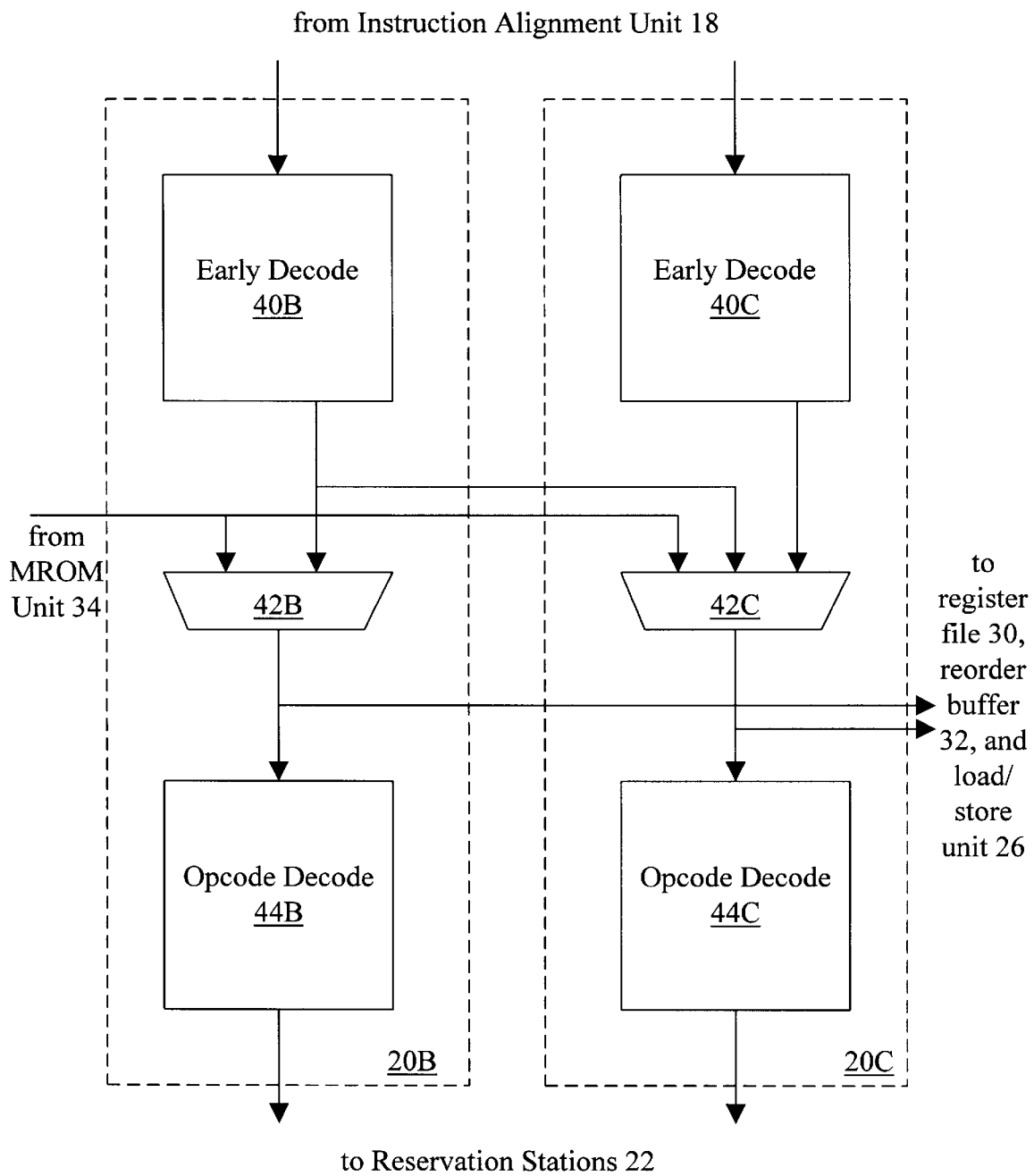
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
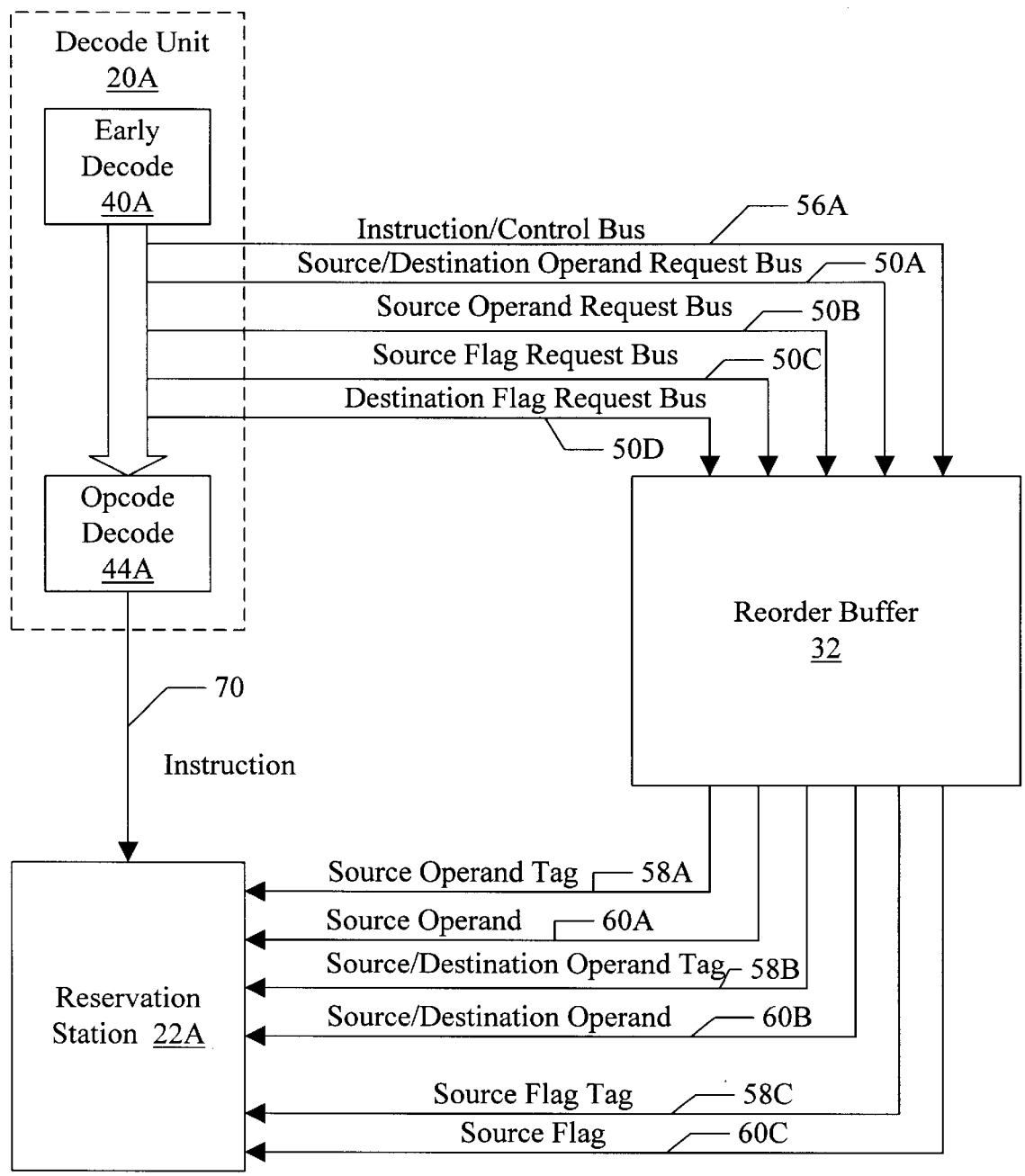
FIG. 3 is a block diagram of a decode unit, a reorder buffer, and a reservation station shown in FIG. 1, illustrating interconnection therebetween according to one embodiment of the microprocessor.

Turning now to FIG. 3, a block diagram of decode unit 20A, reorder buffer 32, and reservation station 22A is shown. Interconnection between these units is shown according to one embodiment of microprocessor 10. Additional interconnection may be employed as well. As shown in FIG. 3, decode unit 20A includes an early decode unit 40A and an opcode decode unit 44A similar to decode units 20B–20C as shown in FIG. 2. A multiplexor similar to multiplexors 42B–42C may be included as well. Connections between other decode units 20B–20C, reorder buffer 32, and reservation stations 22B–22C may be similar.

Several buses are connected between decode unit 20A and reorder buffer 32 as shown in FIG. 3. Particularly, an instruction/control bus 56A, a source/destination operand request bus 50A, a source operand request bus 50B, a source flag request bus 50C, and a destination flag request bus 50D are coupled between decode unit 20A and reorder buffer 32. An instruction bus 70 is coupled between opcode decode unit 44A and reservation station 22A. Several buses are coupled between reorder buffer 32 and reservation station 22A as well. These buses include a source operand tag bus 58A, a source operand bus 60A, a source/destination operand tag bus 58B, a source/destination operand bus 60B, a source flag tag bus 58C, and a source flag bus 60C.

Early decode unit 40A receives an instruction from instruction alignment unit 18, and locates the operands therein. The source/destination operand specifier of the instruction (if for a register operand) is conveyed upon source/destination operand request bus 50A. Similarly, the source operand specifier of the instruction (if for a register operand) is conveyed upon source operand request bus 50B. Source flags used by the instruction are decoded from the instruction, and corresponding source flag specifiers are conveyed upon source flag request bus 50C. Similarly, destination flags for the instruction are decoded from the instruction and forwarded to reorder buffer 32 upon destination flag request bus 50D.

According to one embodiment, the x86 microprocessor architecture is employed. As will be appreciated by those of skill in the art, the x86 microprocessor architecture allows for instructions to specify an eight or sixteen bit portion of a register to be a source or destination operand of an instruction in addition to the entire 32 bit register being specifiable as a source or destination operand. For example, the EAX register may be specified for a particular instruction. Alternatively, the AX register (comprising the least significant 16 bits of the EAX register) may be specified; the AH register (comprising the most significant eight bits of the AX register) may be specified; or the AL register (comprising the least significant eight bits of the AX register) may be specified. A size specifier is conveyed upon source/destination operand request bus 50A and source operand request bus 50B, identifying the requested portion of the register identified by the source/destination operand specifier or source operand specifier. Still further, both source/destination operand request bus 50A and source operand request bus 50B include valid signals indicating the validity of the corresponding operand request. A particular register operand specifier may be invalid if the corresponding operand is not used by the instruction or if the corresponding operand is a memory operand requested from load/store unit 26.

After performing dependency checking upon the source operand specifier, a reorder buffer tag corresponding to the source operand may be forwarded upon a source operand tag bus 58A. Alternatively, the operand may be forwarded upon a source operand bus 60A. Similarly, the result of dependency checking for the source/destination operand is conveyed via a source/destination operand tag bus 58B and a source/destination operand bus 60B. It is noted that the destination reorder buffer tag corresponding to the source/destination operand (i.e. the reorder buffer tag identifying the storage location within reorder buffer 32 assigned to the dispatching instruction) is not conveyed upon source/destination operand tag bus 58B. A separate bus (not shown) conveys the destination reorder buffer tag for the instruction.

The source tag for the source flags used by the instruction is selected via dependency checking within reorder buffer 32 and is forwarded upon source flag tag bus 58C. Alternatively, the source flag or flags may be conveyed upon a source flag bus 60C. According to an embodiment of microprocessor 10 employing the x86 microprocessor architecture, the flags comprise an S flag, a Z flag, a P flag, an O flag, a D flag, a C flag, and an A flag. Each flag is one bit. The S flag indicates the sign (positive or negative) of the arithmetic result of executing an instruction. The Z flag is set if the arithmetic result of an instruction is zero. The P flag is used to indicate the parity of the least significant eight bits of the result. The P flag is set if an even number of binary one digits are included in the result and clear if the number of binary one digits is odd. The O flag is set if an operation produces an overflow (i.e. the result cannot be represented in the number of bits comprising the destination operand). The D flag indicates whether string instruction increment or decrement the byte count. The C flag is the carry flag, indicating a carry out of the most significant bit of the result. The A flag indicates a carry out of bit 3 of the result. A value for each flag may be conveyed upon source flag bus 60C. For tag and dependency checking purposes, the flags are divided into four groups. The first group comprises the S, Z, P, and A flags. The second group comprises the O flag. The third group comprises the D flag. Finally, the fourth group comprises the C bit. If an instruction updates one or more flags within a group, then a dependency is detected between that instruction and an instruction which uses one of more flags from that group as a source operand.

Reorder buffer 32, in addition to receiving requests for register operands, also receives additional instruction identification signals from early decode unit 40A upon instruction/control bus 56A. The information conveyed upon instruction/control bus 56A is information which reorder buffer 32 uses to handle exception recovery and retirement of instructions. For example, branch instructions are identified. Additionally, instructions which request a memory operand are identified. Both of these types of instructions can experience exceptions, and so the control information can be used to indicate which instructions in the reorder buffer may create exceptions. Additionally, the address of the instruction is conveyed such that, if the instruction does experience an exception, the instruction can be identified by an exception handling routine (in the case of an exception visible to software) or exception handling hardware (in the case of an exception recovered by hardware). Many other control signals may be employed depending upon various implementational choices. Generally, reorder buffer 32 operates upon the signals provided upon instruction/control bus 56A and similar buses from other early decode units 40 to form control information for storage in the instruction storage within reorder buffer 32. The control information is typically encoded (i.e. the control information comprises fewer bits than the number of signals provided by instruction/control bus 56A and similar buses from other decode units 20). For example, the address of each instruction may not be stored in the instruction storage. Instead, the address of the instruction from decode unit 20A may be stored. Offsets measured from the address may be stored for the instructions from each of the other decode units. In one embodiment, up to one branch instruction may be stored in each line of storage within reorder buffer 32. Therefore, up to two addresses may be stored for a set of concurrently decoded instructions (one address for instructions prior to and including the branch instruction, and the second address for instructions subsequent to the branch instruction, within the instructions in the line). For each instruction, reorder buffer 32 stores an offset and an indication of the address to which the offset corresponds.

Opcode decode unit 44A receives the instruction from early decode unit 40A and decodes the opcode of the instruction into a set of control signals for reservation station 22A. The decoded instruction is provided to reservation station 22A upon an instruction bus 70, which stores the instruction into a storage location allocated therein. The storage location includes space for storing the reorder buffer tags and operand values provided by reorder buffer 32. Additionally, operand values may be captured from result bus 38 (shown in FIG. 1).

Figure 4:
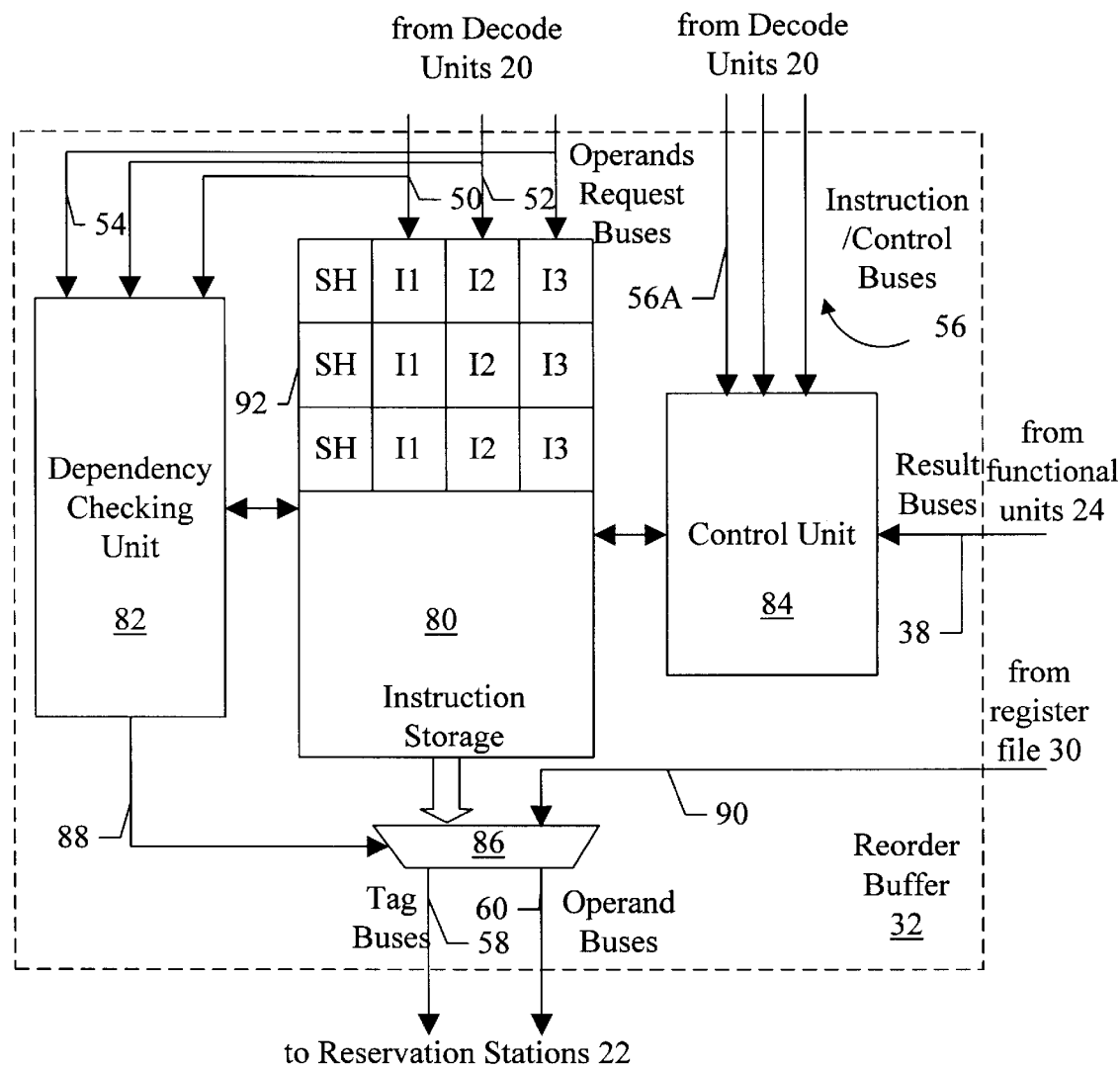
FIG. 4 is a block diagram of one embodiment of the reorder buffer shown in FIG. 1.

Turning next to FIG. 4, a block diagram of one embodiment of reorder buffer 32 is shown. As shown in FIG. 4, reorder buffer 32 includes an instruction storage 80, a dependency checking unit 82, a control unit 84, and a selection device 86. Both dependency checking unit 82 and control unit 84 are coupled to instruction storage 80. Additionally, dependency checking unit 82 provides selection controls upon a selection controls bus 88 to selection device 86. Instruction storage 80 is coupled to selection device 86, and register file 30 is coupled to selection device 86 via a bus 90 to provide register values stored therein in response to the register operand specifiers conveyed upon the operands request buses from decode units 20. Control unit 84 is coupled to result buses 38 and to instruction/control buses 56 (including instruction/control bus 56A from decode unit 20A). Both dependency checking unit 82 and instruction storage 80 are coupled to operands request buses 50 from decode unit 20A. Operands request buses 50 comprise source/destination operands request bus 50A, source operand request bus 50B, source flag request bus 50C, and destination flag request bus 50D. Operands request buses 52 from decode unit 20B and operands request buses 54 from decode unit 20C comprise a similar set of buses as operands request buses 50, as will be shown in greater detail in FIGS. 5, 6, and 7 below. Both dependency checking unit 82 and instruction storage 80 are coupled to operands request buses 52 and 54. Selection device 86 is coupled to tag buses 58 and operand buses 60. Tag buses 58 include source operand tag bus 58A, source/destination operand tag bus 58B, and source flag tag bus 58C for reservation station 22A as well as similar buses for reservation stations 22B–22C. Operand buses 60 include source operand bus 60A, source/destination operand bus 60B, and source flag bus 60C for reservation station 22A as well as similar buses for reservation stations 22–22C.

Dependency checking unit 82 performs dependency checking between the operand specifiers conveyed upon operands request buses 50–54 and the destination operand specifiers stored in instruction storage 80. An LIB indication is stored for each instruction within instruction storage 80, and the LIB indication is included in the dependency checking comparisons. A dependency is detected if the LIB indication indicates that the corresponding instruction is last, in program order, to update the storage location specified by the destination operand specifier for the corresponding instruction and the destination operand specifier matches a source operand specifier. The comparison results identify at most one dependency upon a destination operand specifier stored in instruction storage 80 for each source operand specifier.

Concurrent with dependency checking against the instructions represented in instruction storage 80, dependency checking unit 82 performs dependency checking between each of the source/destination operand specifiers conveyed upon operands request buses 50 and 52 and the operand specifiers of instructions which are concurrently decoded with the instruction corresponding to the source/destination operand specifier and which are subsequent, in program order to that instruction. Dependency checking between instructions which are concurrently presented to reorder buffer 32 is referred to herein as "interline dependency checking". More particularly, the source/destination operand specifier conveyed upon operands request buses 50 is compared to the operand specifiers conveyed on both operands request buses 52 and operands request buses 54. Similarly, the source/destination operand specifier conveyed upon operands request buses 52 is compared to the operand specifiers conveyed upon operands request buses 54. If a dependency is detected via interline dependency checking, that dependency takes precedence over any dependencies detected via comparison with the destination operand specifiers stored in instruction storage 80.

Dependency checking unit 82 generates selection controls upon selections controls bus 88 in response to the dependency checking. If a dependency is detected for a particular operand of a particular instruction upon an instruction represented within instruction storage 80 and no dependency is detected via interline dependency checking, the reorder buffer tag indicated via the dependency is provided upon the tag bus 58 corresponding to the particular operand and the corresponding operand (if stored in instruction storage 80) is provided upon the operand bus 60 corresponding to the particular operand. If a dependency is detected via interline dependency checking, the reorder buffer tag of the concurrently decoded instruction is provided. No operand value is provided since the concurrently decoded instruction has yet to execute. Finally, if no dependency is detected, the corresponding value provided upon bus 90 by register file 30 is selected via the selection controls.

Dependency checking unit 82 updates the LIB indications of the instructions represented within instruction storage 80. For the instructions presented via operand request buses 50–54 during a clock cycle, the LIB indication is set to the state indicating that the instruction is last, in program order, to update the destination storage location unless a subsequent one of the concurrently decoded instructions updates the destination storage location. Additionally, if a dependency is detected between a destination operand specifier within instruction storage 80 and a source/destination operand conveyed upon operands request buses 50–54, the LIB indication corresponding to the destination operand specifier is set to the state indicating that the corresponding instruction is not last, in program order, to update the destination storage location.

Control unit 84 receives the instruction identification signals upon instruction/control buses 56. Control unit 84 encodes the information presented for storage in instruction storage 80. Furthermore, control unit 84 allocates storage for each instruction in instruction storage 80. The storage allocated for each instruction includes space for storing the instruction result (i.e. the destination operand), the source and source/destination specifiers, the reorder buffer tag corresponding to the destination operand, and the encoded instruction information generated by control unit 84 for the instruction.

According to one embodiment, instruction storage 80 is configured as a line-oriented buffer as described above. A line 92 is configured to store instruction information for a maximum number of concurrently decodable instructions in microprocessor 10. According to the embodiment of microprocessor 10 shown in FIG. 1, the maximum number of concurrently decodable instructions is three. Other embodiments may define the maximum number of concurrently decodable instructions differently. The line 92 is allocated upon presentation of at least one instruction to reorder buffer 32, regardless of the number of instructions actually presented. For a line-oriented embodiment, the line tag corresponding to the line may be stored by instruction storage 80 as opposed to different reorder buffer tags for each instruction in the line. The offset tag is inherent in the position of the instruction within the line.

As shown in FIG. 4, a line 92 includes storage for information pertaining to each instruction (I1–I3), and storage for information shared among the instructions (SH). The shared information is information which is common to the instructions in the line (e.g. the up to two program counter addresses stored for the line of instructions) or is a feature of the line of instructions as a whole (e.g. whether or not one or more of the instructions in the line can cause an exception).

Because the instructions within a line 92 are retired concurrently and one line is retired in a given clock cycle, a set of last in line (LIL) indications are stored for each destination operand. The LIL indications identify which of the instruction results are the last in the line to update the destination identified for that instruction. The LIL indications are used as write enables in register file 30 for storing the results of the line therein. By using the LIL indications, at most one result (from one instruction) is stored into a register or portion thereof.

Control unit 84 is further configured to route instruction results to the corresponding storage locations within instruction storage 80 upon receipt of the results from result buses 38. Additionally, control unit 84 handles exception recovery if a particular instruction result includes an indication that an exception has occurred. Furthermore, instruction retirement is handled by control unit 84.

It is noted that, in the present description, instructions may be referred to as being "stored" within reorder buffer 32. Instruction bytes themselves may not actually be stored in reorder buffer 32. Instead, information used be reorder buffer 32 in the retirement and exception recovery of instructions may be stored for each instruction, as well as source and destination operand information. When instructions are referred to as being stored within reorder buffer 32, the instructions are allocated a storage location for storing the aforementioned information.

Figure 5:
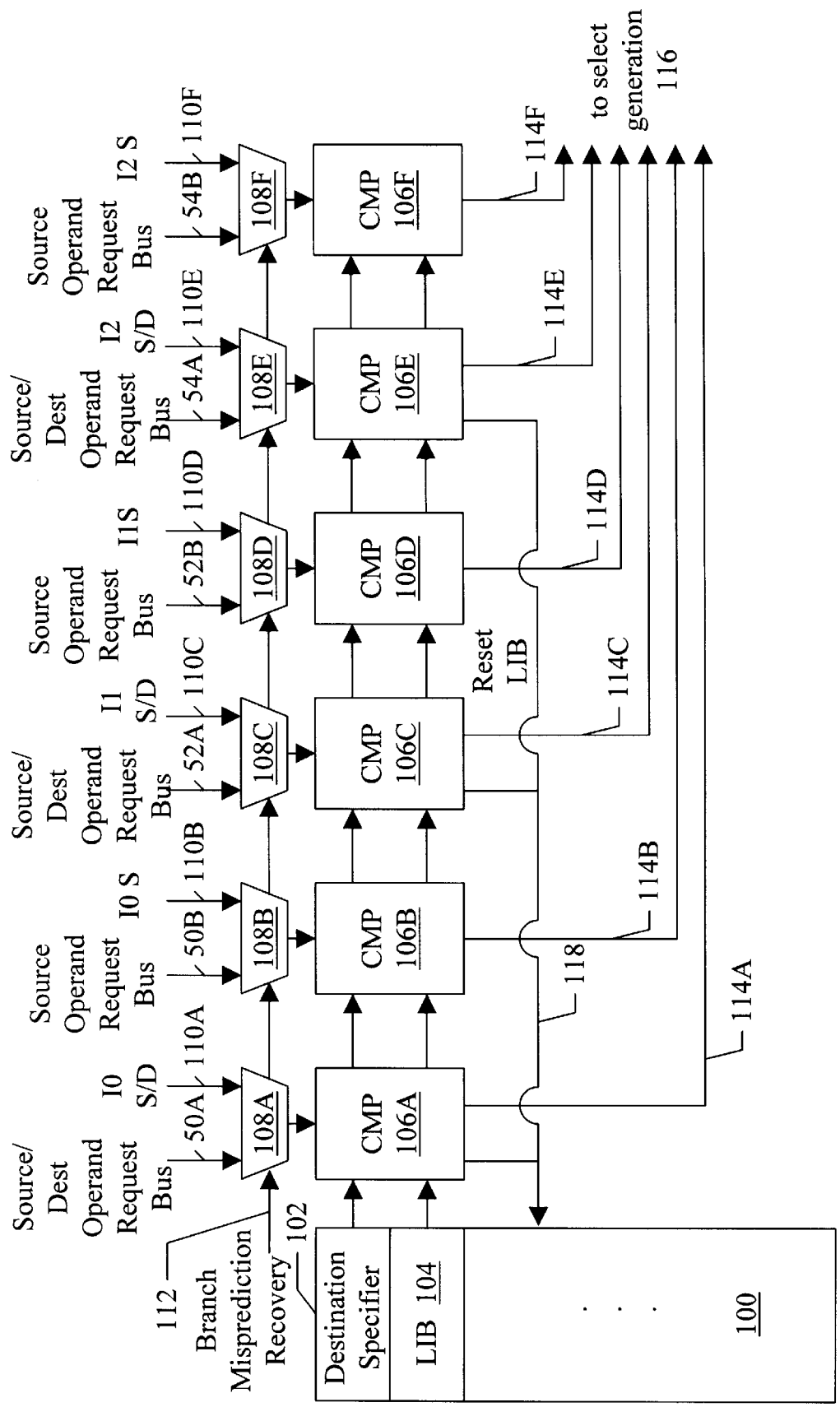
FIG. 5 is a block diagram of a first portion of one embodiment of a dependency checking unit shown in FIG. 4.

Turning next to FIG. 5, a block diagram of a first portion of one embodiment of dependency checking unit 82 is shown. FIG. 5 illustrates the comparators used to perform dependency checking between the destination operand specifier corresponding to one instruction within instruction storage 80 and the operands corresponding to instructions being concurrently presented to reorder buffer 32. A storage location 100 corresponding to one instruction is shown. In the embodiment of FIG. 4, for example, storage location 100 may comprise I0, I1, or I2 of a line 92. Storage location 100 stores information regarding one instruction. Included in storage location 100 is a destination operand specifier field 102 and an LIB field 104. Destination operand specifier field 102 stores a destination operand specifier corresponding to the instruction represented by storage location 100. It is noted that the destination operand specifier is a source/destination specifier in embodiments of microprocessor 10 employing the x86 microprocessor architecture. LIB field 104 stores the LIB indication corresponding to the instruction represented by storage location 100.

Multiple comparator circuits 106A–106F are shown in FIG. 5. Each comparator circuit 106A–106F is coupled to receive the destination operand specifier and LIB indication stored in storage location 100. Additionally, each comparator circuit 106A–106F is coupled to receive the output of a corresponding multiplexor 108A–108F. Each multiplexor 108A–108F is configured to select either a source operand specifier or a source/destination operand specifier corresponding to an instruction being presented to reorder buffer 32 when branch misprediction recovery is not being performed. Alternatively, during branch misprediction recovery, each multiplexor 108A–108F selects either a source operand specifier or a source/destination operand specifier corresponding to instructions stored within instruction storage 100, as detailed further below.

As shown in FIG. 5, multiplexor 108A is coupled to source/destination operand request bus 50A and to an I0 source/destination operand request bus 110A. I0 source/destination operand request bus 110A conveys the information similar to source/destination operand request bus 50A, but the information corresponds to an instruction in the I0 storage location of a line of instruction storage 80. Multiplexor 108B is coupled to source operand request bus 50B and to I0 source operand request bus 110B. Similarly, multiplexors 108C–108F are coupled to buses 52A–52B, 54A–54B, and 110C–110F. Buses 52A–52B are included within operands request buses 52 shown in FIG. 4. Buses 54A–54B are included within operands request buses 54 shown in FIG. 4. Multiplexors 108A–108F receive a selection control 112 from control unit 84. If reorder buffer 32 is recovering from a branch misprediction, selection control 112 is asserted and multiplexors 108 select the corresponding bus 110 for presentation to comparator circuits 106. If reorder buffer 32 is not recovering from a branch misprediction, buses 50A–50B, 52A–52B, and 54A–54B are selected by the multiplexor 108A–108F coupled thereto for presentation to comparator circuits 106.

Each comparator circuit 106A–106F is coupled to a corresponding output signal line 114A–114F. Signal lines 114 are conveyed to a select generation block 116 (shown in FIG. 7). Comparator circuits 106A–106F compare the destination operand specifier provided from destination specifier field 102 to the operand specifier provided by the corresponding multiplexor 108. In addition, the size specifier provided by multiplexor 108 and the LIB indication are used to qualify the comparison. The output signal 114 of a comparator 106 is asserted if the operand specifiers match and the LIB indication for the portion of the register indicated by the size specifier indicates that the corresponding instruction is last, in program order, among the instructions in instruction storage 80 to have that destination operand specifier.

According to one embodiment of microprocessor 10 employing the x86 microprocessor architecture, the LIB indication comprises four bits. The most significant bit indicates, when set, that the corresponding instruction is the last to update the entire register. The second most significant bit indicates, when set, that the corresponding instruction is the last to update the least significant sixteen bits of the register. The third most significant bit indicates, when set, that the corresponding instruction is the last to update the most significant eight bits of the least significant 16 bits of the register. Finally, the least significant bit indicates, when set, that the corresponding instruction is the last to update the least significant eight bits of the register. One of the bits of the LIB indication is selected according to the size specifier conveyed by the multiplexor 108A–108F to the comparator circuit 106A–106F. If the selected bit is set and the comparison of operand specifiers results in a match, the corresponding output signal 114 is asserted.

Comparator circuits 106 operate in a similar manner during branch misprediction recovery sequences. However, multiplexors 108 are directed to select buses 110 during the sequences. Because one or more lines of instructions within instruction storage 80 may be discarded as a result of a branch misprediction, the LIB indications of the remaining instructions are rebuilt to a state consistent with the lines of instructions remaining in the buffer. Upon detection of a branch misprediction, control unit 84 clears the LIB indications of the instructions remaining in the instruction buffer. Control unit 84 then asserts the branch misprediction recovery signal upon selection control 112 and, beginning with the line containing the instruction which is foremost in program order and continuing in program order thereafter, passes each line of instructions through dependency checking unit 82 to create LIB status.

In addition to providing output signals for select generation block 116, comparator circuits 106A, 106C, and 106E (i.e. the comparator circuits which receive source/destination operands) provide a reset LIB bus 118 to storage location 100 for updating the LIB indication for that storage location. Reset LIB bus 118 comprises a signal corresponding to each bit of the LIB indication. If the signal is asserted, the corresponding bit of the LIB indication is reset. Comparator circuits 106A, 106C, and 106E generate the reset LIB indication according to the size of the source/destination operand provided thereto upon detection of a match between the source/destination operand. For example, if the EAX register is identified by the source/destination operand specifier and the size encoding indicates EAX, then all of the LIB bits are reset. If the AX register is indicated by the size encoding, then all but the most significant bit of the LIB bits are reset. If the AH or AL register is indicated by the size encoding, then the corresponding LIB bit is reset.

It is noted that the above text describes branch misprediction recovery as causing the LIB indications rebuilt. In the present embodiment, branch mispredictions are recovered speculatively (i.e. before the corresponding branch instruction is ready to be retired). Other exceptions are recovered non-speculatively. Generally speaking, LIB indications may be rebuilt for any exception which is speculatively recovered from, in various embodiments.

Turning next to FIG. 5A, a truth table 120 corresponding to one embodiment of comparator circuits 106 is shown. A column 122 indicates the result of comparing the operand specifiers received by the comparator circuit. The operand specifiers either match or do not match. A column 124 indicates the size specifier, using an encoding similar to that for the LIB indication. It is noted that the size information may be encoded in any suitable format, and the encoding may differ from the LIB encoding. A column 126 indicates the encoding of the LIB indication. Finally, a column 128 indicates the asserted/deasserted state of the output signal 114 from the comparator circuit for each set of input values represented in columns 122, 124, and 126. An "x" in table 120 indicates that the corresponding value is a don't care for that entry in the table.

As table 120 shows, if the operand specifiers do not match, then the output signal is deasserted. If the operand specifiers match, then the output signal is either asserted or deasserted depending upon the size specifier for the operand and the LIB indication.

Figure 6:
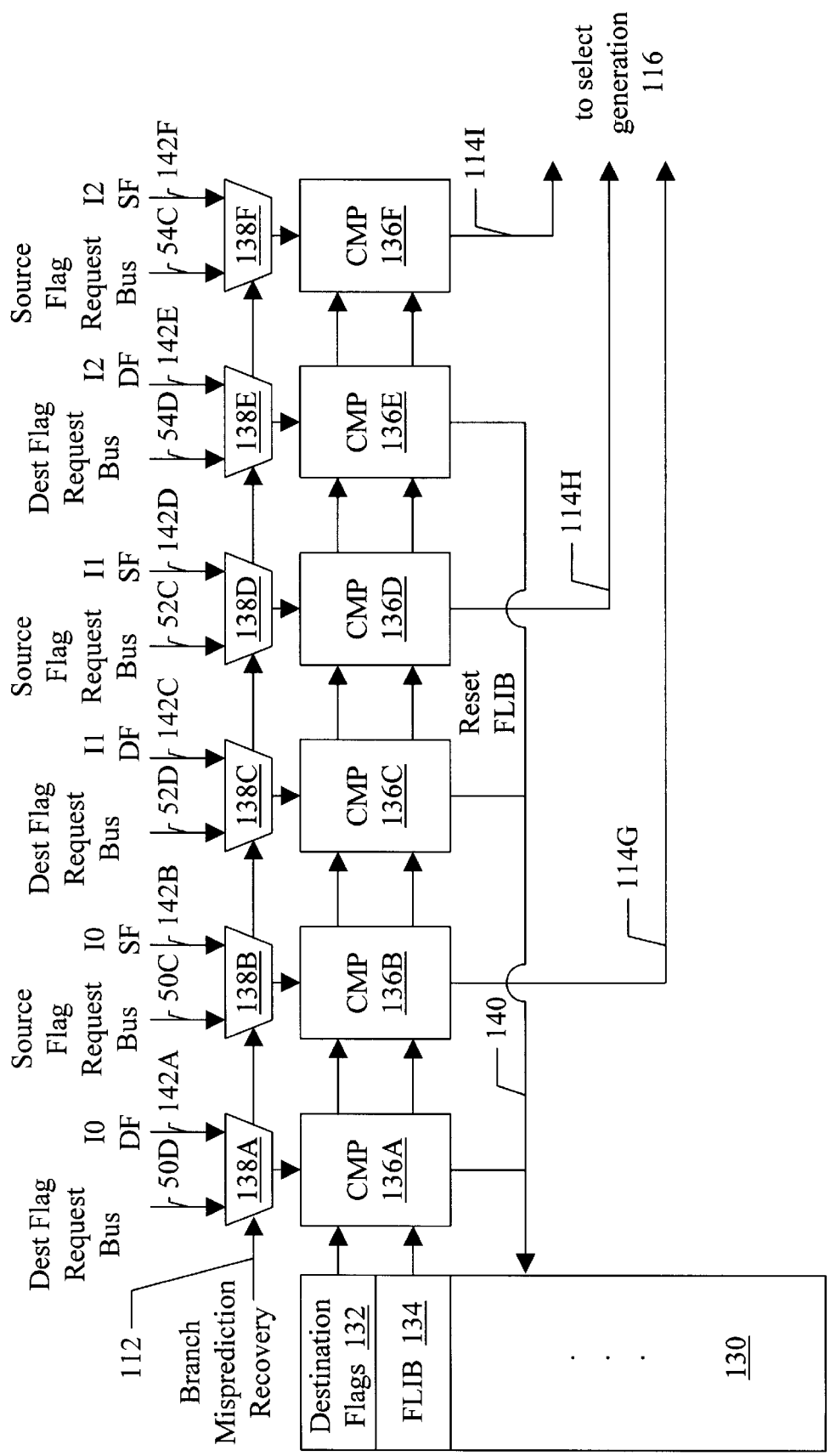
FIG. 6 is a block diagram of a second portion of one embodiment of a dependency checking unit shown in FIG. 4.

Turning next to FIG. 6, a block diagram of a second portion of one embodiment of dependency checking unit 82 is shown. FIG. 6 illustrates the comparator circuitry used to perform dependency checking between a destination flags specifier for one instruction stored in instruction storage 80 and the source and destination flag specifiers provided upon operands request buses 50–54. A storage location 130 is shown, including a destination flag specifier field 132 and a flag last in buffer (FLIB) indication field 134. For the present embodiment, the FLIB indication includes one bit for each group of flags. The bit, when set, indicates that the corresponding instruction is the last instruction within instruction storage 80 to update the corresponding group of flags. Similarly, the source and destination flags specifiers each comprises a bit for each group of flags. If the bit is set, the corresponding group of flags is a source or destination of the instruction. If the bit is clear, the corresponding group of flags is not an operand of the instruction.

A set of comparator circuits 136A–136F are included in FIG. 6. Each of comparator circuits 136 receive the destination flags specifier stored in field 132 as well as the FLIB indication stored in field 134. Comparator circuits 136B, 136D, and 136F receive source flags specifiers from corresponding multiplexors 138B, 138D, and 138F. The source flags specifiers identify which groups of flags are source operands for the instructions being presented to reorder buffer 32. If the FLIB indication indicates that the instruction corresponding to storage location 130 is last to update a group of flags and the group of flags is a source operand for an instruction, then the corresponding comparator circuit 136B, 136D, or 136F asserts its output signal upon an output signal line 114G, 114H, or 114I (respectively). Select generation block 116, shown in FIG. 7 below, receives the output signal lines 114.

Comparator circuits 136A, 136C, and 136E are used to compare destination flags specifiers corresponding to instructions being presented to reorder buffer 32 to the destination flags specifier stored in storage location 130. The destination flags specifiers corresponding to instructions being presented to reorder buffer 32 are provided by corresponding multiplexors 138A, 138C, and 138E. A reset FLIB bus 140 is coupled between comparator circuits 136A, 136C, and 136E. If a destination flags specifier corresponding to an instruction updates a group of flags and the FLIB indication stored in storage location 130 is set, then the comparator circuit 136 asserts a signal upon reset FLIB bus 140 to cause the corresponding FLIB indication to be reset.

Similar to the first portion of dependency checking unit 82 shown in FIG. 5, the second portion of dependency checking unit 82 shown in FIG. 6 participates in branch misprediction recovery. Source and destination flag specifiers corresponding to a line of instructions within instruction storage 80 are provided upon multiple buses 142A–142E as shown in FIG. 6. Control unit 80, in addition to selecting the line conveyed upon buses 142, asserts the branch misprediction recovery signal upon control line 112 coupled to multiplexors 138.

Figure 7:
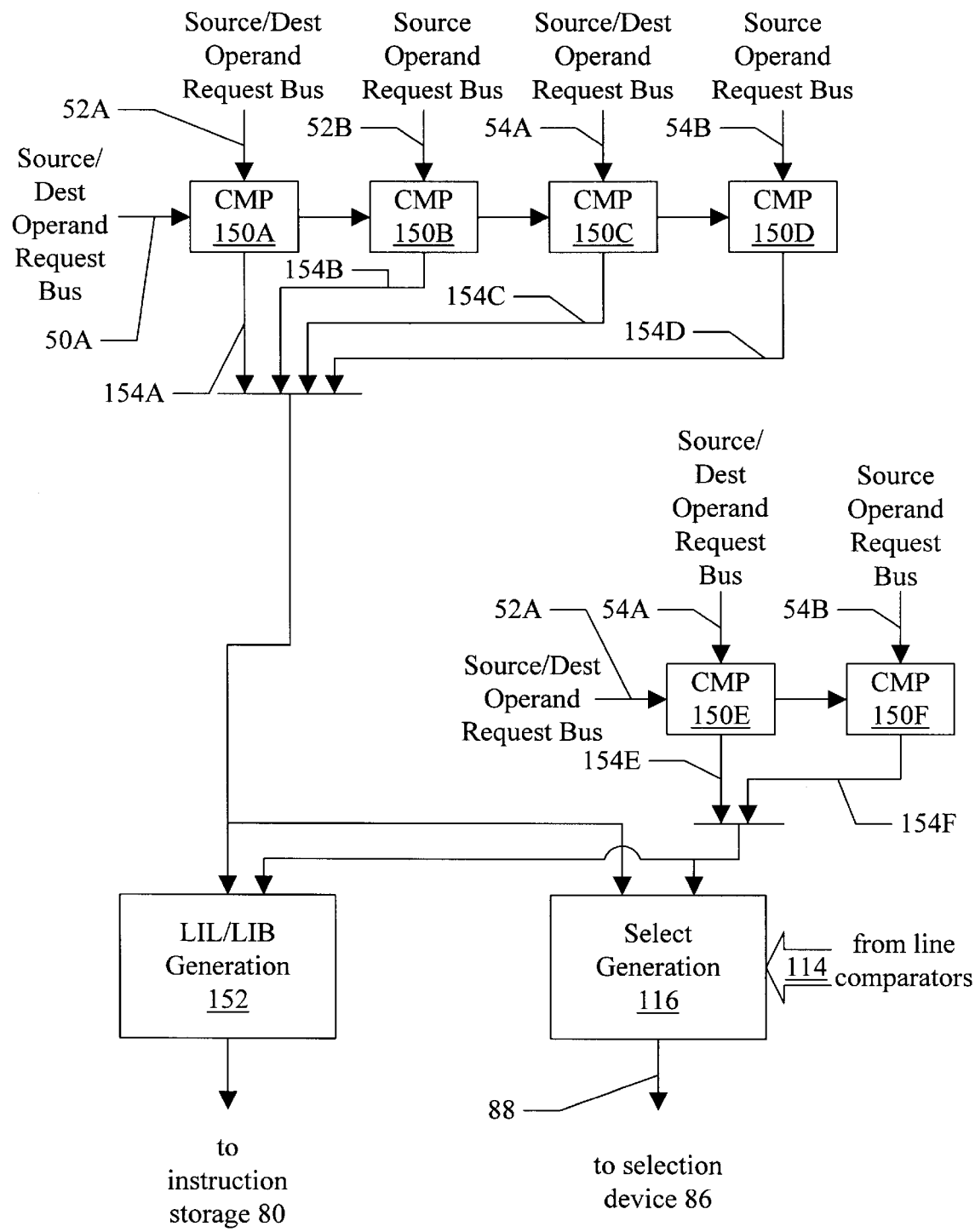
FIG. 7 is a block diagram of a third portion of one embodiment of a dependency checking unit shown in FIG. 4.

Turning next to FIG. 7, a block diagram of a third portion of one embodiment of dependency checking unit 82 is shown. The third portion of dependency checking unit 82 includes multiple comparator circuits 150A–150F, an LIL/LIB generation block 152, and select generation block 116. Comparator circuits 150A–150F are coupled to source/destination request buses 50A, 52A, and 54A and source request buses 50B, 52B, 54B as shown in FIG. 7. Output signal lines 154A–154F from respective comparator circuits 150A–150F are coupled to LIL/LIB generation block 152 and to select generation block 116. Additionally, select generation block 116 receives control lines 114 from the comparator circuits for each instruction represented within each line of instruction storage 80. Control lines 114 include control lines 114A–114I shown in FIGS. 5 and 6.

Comparator circuits 150A–150D are used to compare the source/destination operand specifier corresponding to the instruction being decoded by decode unit 20A to the source/destination operand specifiers and source operand specifiers of the instructions being decoded in decode units 20B and 20C. Similarly, comparator circuits 150E–150F are used to compare the source/destination operand specifier of the instruction being decoded in decode unit 20B to the source/destination operand specifier and the source operand specifier of the instruction being decoded in decode unit 20C. In other words, comparator circuits 150 perform interline dependency checking. If comparator circuit 150A or 150C indicates a match, then the instruction being decoded by decode unit 20A is not the last of the instructions being concurrently decoded by decode units 20 to update the storage location identified by the source/destination operand specifier. Therefore, the LIB indication corresponding to the instruction being decoded by decode unit 20A is not set. A similar interpretation of the output of comparator circuit 150E is applied to the setting of the LIB indication for the instruction being decoded by decode unit 20B. LIL/LIB generation unit generates LIB indications for the instructions being presented to reorder buffer 32 and conveys them to instruction storage 80 for storage along with other instruction information. It is noted that the comparisons performed by comparator circuits 150 include the size of the various operands, and the LIB indications are set accordingly. For example, if the source/destination operand specifier conveyed upon source/destination operand request bus 50A identifies the EAX register and the source/destination operand specifier conveyed upon source/destination operand request bus 52A identifies the AX register, then the LIB bit corresponding to the most significant 16 bits of the EAX register is set for the instruction being decoded by decode unit 20A, while the remaining LIB bits are set for the instruction being decoded by decode unit 20B.

In addition to LIB generation, LIL/LIB generation block 152 generates a set of last in line (LIL) indications for the instructions being presented to reorder buffer 32. The LIL indications serve as write enables for register file 30 when the corresponding line of instructions is retired. The LIL indications indicate which portions of a particular register that the corresponding instruction is the last within the line of instructions to update. Initially, the LIL indication is comparable to the LIB indication generated by LIL/LIB generation block 152. However, while the LIB indications may be updated according to the dispatch of subsequent instructions, the LIL indications remain constant unless an exception is detected within the line of instructions which causes the discard of an instruction from the line. LIL/LIB generation block 152 conveys the LIL indications to instruction storage 80 along with the LIB indications.

Output lines 114 may be divided into groups corresponding to each source operand, source/destination operand, and source flag operand of each instruction being presented to reorder buffer 32 (i.e. being decoded by decode units 20). Of the output lines 114 corresponding to each operand, at most one signal is asserted due to the LIB/FLIB indications being included in the comparisons.

The output signals upon output lines 154 are received by selection generation block 116 as well. If the output signal upon one of output lines 154 corresponding to a source operand is asserted, then the output lines 114 corresponding to that source operand do not reflect the actual dependency for that source operand. If comparators 150 do not indicate an interline dependency for a given source operand, the corresponding output lines 114 are forwarded to selection device 86 upon control bus 88 for selecting reorder buffer tags/operands from instruction storage 80. If comparators 150 indicate an interline dependency, then select generation block 116 deasserts the corresponding set of output signals 116 before forwarding the signals upon control bus 88. Control bus 88 includes additional control signals for selecting the reorder buffer tag assigned to the set of concurrently decoded instructions as the reorder buffer tag for the corresponding source operand. Select generation unit 116 asserts one of the additional control signals in response to the asserted output signals 154. Finally, if none of the group of signals 114 corresponding to a particular source operand are asserted and none of the output signals 154 corresponding to the particular source operand are asserted, select generation unit 116 asserts a control signal upon control bus 88 causing the value provided by register file 30 upon bus 90 to be conveyed.

A set of comparator circuits similar to comparator circuits 150 are included for detecting interline dependencies for flag operands. Select generation unit 116 receives the result of these comparisons as well, and forwards portions of output signals 114 corresponding to the flag operands or deasserts the output signals and selects an interline dependency tag according to the results of the comparisons.

Figure 8:
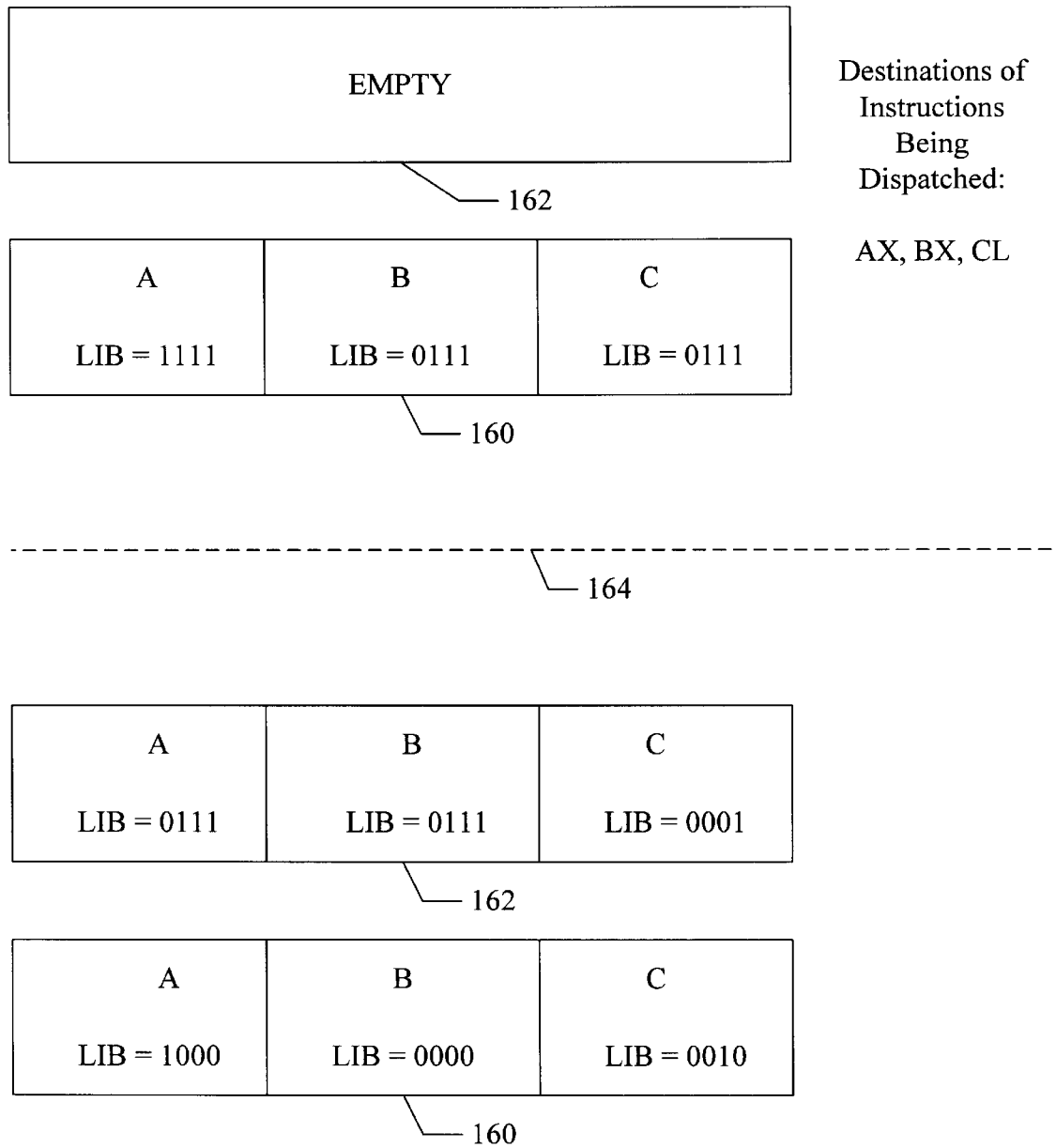
FIG. 8 is an example of the update of the last in buffer bits according to one embodiment of the microprocessor.

Turning now to FIG. 8, an example of the update of the LIB indications upon dispatch of a line of instructions is shown. FIG. 8 shows a first line 160 and a second line 162 of instruction storage 80 during a first clock cycle in which a line of instructions is dispatched and a second clock cycle subsequent to the first clock cycle. First line 160 and second line 162 as shown above the dotted line 164 in FIG. 8 comprise the state of the lines prior to dispatch of the instructions being dispatched during the first clock cycle, and the first line 160 and second line 162 shown below the dotted line 164 comprise the state of the lines subsequent to dispatch of the instructions being dispatched during the first clock cycle.

As shown in FIG. 8, the first line of instructions includes a first instruction which updates register A (i.e. EAX, AX, etc.), a second instruction which updates register B, and a third instruction which updates register C. The first instruction is prior to the second instruction in program order, and the second instruction is prior to the third instruction in program order. The LIB indication corresponding to the first instruction indicates that the first instruction is the last to update all portions of register A. Similarly, the LIB indication corresponding to the second instruction indicates that the second instruction is the last to update the least significant 16 bits of register B (i.e. BX) and the LIB indication corresponding to the third instruction indicates that the third instruction updates the least significant 16 bits of register C (i.e. CX). The second line of instructions is empty during the first clock cycle, and is allocated to receive the instructions being dispatched during the first clock cycle. For this example, the instructions being dispatched have destination operand specifiers identifying the AX, BX, and CL registers.

The state of first line 160 and second line 162 below dotted line 164 reflects update of the LIB indications within first line 160 and the creation of LIB indications within second line 162. Since an instruction within second line 162 updates the AX register, the LIB indication of the first instruction within first line 160 is updated to indicate that the first instruction is last to update the most significant 16 bits of the A register, and that another instruction is last to update the remaining portion of register A. The first instruction within second line 162 updates the AX register, and the corresponding LIB indication is shown.

Similarly, the LIB indication corresponding to the second instruction within first line 160 is cleared, since the second instruction within second line 162 updates each portion of the B register which is updated by the second instruction of first line 160. Finally, the LIB indication corresponding to the third instruction of first line 160 indicates that the third instruction is last to update the CH portion of the C register. The third instruction of second line 162 updates the CL portion, leaving the CH portion as modified by the third instruction of first line 160. If an instruction is dispatched which uses the CH register as a source operand, the dependency upon the third instruction of first line 160 will be detected.

Figure 9:
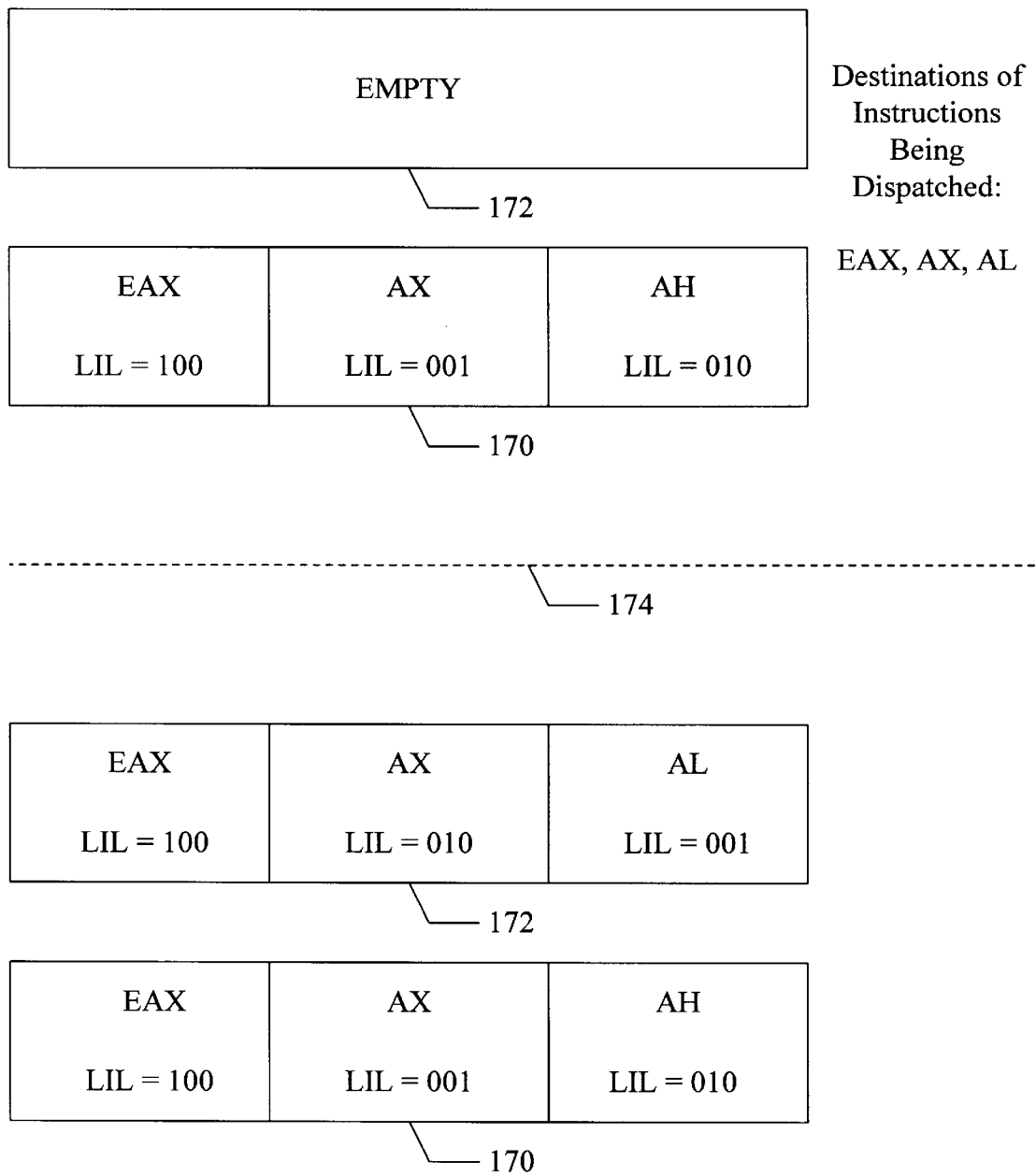
FIG. 9 is an example of the update of the last in line bits according to one embodiment of the microprocessor.

Turning next to FIG. 9, an example of the creation of LIL indications is shown. A first line 170 and a second line 172 of instruction storage 80 is shown. The state of first line 170 and second line 172 during a first clock cycle during which a set of instructions is dispatched is shown above a dotted line 174. Below dotted line 174, the state of first line 170 and second line 172 is illustrated during a second clock cycle subsequent to the first clock cycle. During the first clock cycle, first line 170 includes a first instruction which has the EAX register as a destination, a second instruction which has the AX register as a destination, and a third instruction which has the AH register as a destination. The first instruction is prior to the second instruction in program order, and the second instruction is prior to the third instruction in program order. Since the second and third instructions of first line 170 update the least significant 16 bits of the A register, the LIL indication is encoded to indicate that the first instruction is the last in the line to update the most significant sixteen bits of the A register. The third instruction updates the AH portion of the A register (i.e. the most significant 8 bits of the least significant sixteen bits of the A register). Since the second instruction updates the AX portion of the A register, the LIL indication for the second instruction indicates that the second instruction is last in the line to update the AL portion of the A register (i.e. the least significant eight bits of the A register). Finally, the LIL indication of the third instruction indicates that the third instruction is the last in the line to update the AH portion of the A register.

During the first clock cycle, instructions are dispatched. The first instruction in program order has the EAX register as a destination operand. The second instruction in program order has the AX register as a destination operand. Finally, the third instruction in program order has the AL register as a destination operand. The instructions being dispatched are allocated to second line 172, as illustrated below dotted line 174.

Since the LIL indications are not modified in response to the dispatch of additional instructions, the state of first line 170 during the second clock cycle is the same as the state of first line 170 during the first clock cycle. Since the second and third instructions of second line 172 update the least significant 16 bits of the A register, the LIL indication for the first instruction of second line 172 is encoded to indicate that the first instruction is the last in the line to update the most significant sixteen bits of the A register. The third instruction updates the AL portion of the A register (i.e. the least significant 8 bits of the A register). Since the second instruction updates the AX portion of the A register, the LIL indication for the second instruction indicates that the second instruction is last in the line to update the AH portion of the A register (i.e. the most significant eight bits of the least significant sixteen bits of the A register). Finally, the LIL indication of the third instruction indicates that the third instruction is the last in the line to update the AL portion of the A register.

Figure 10:
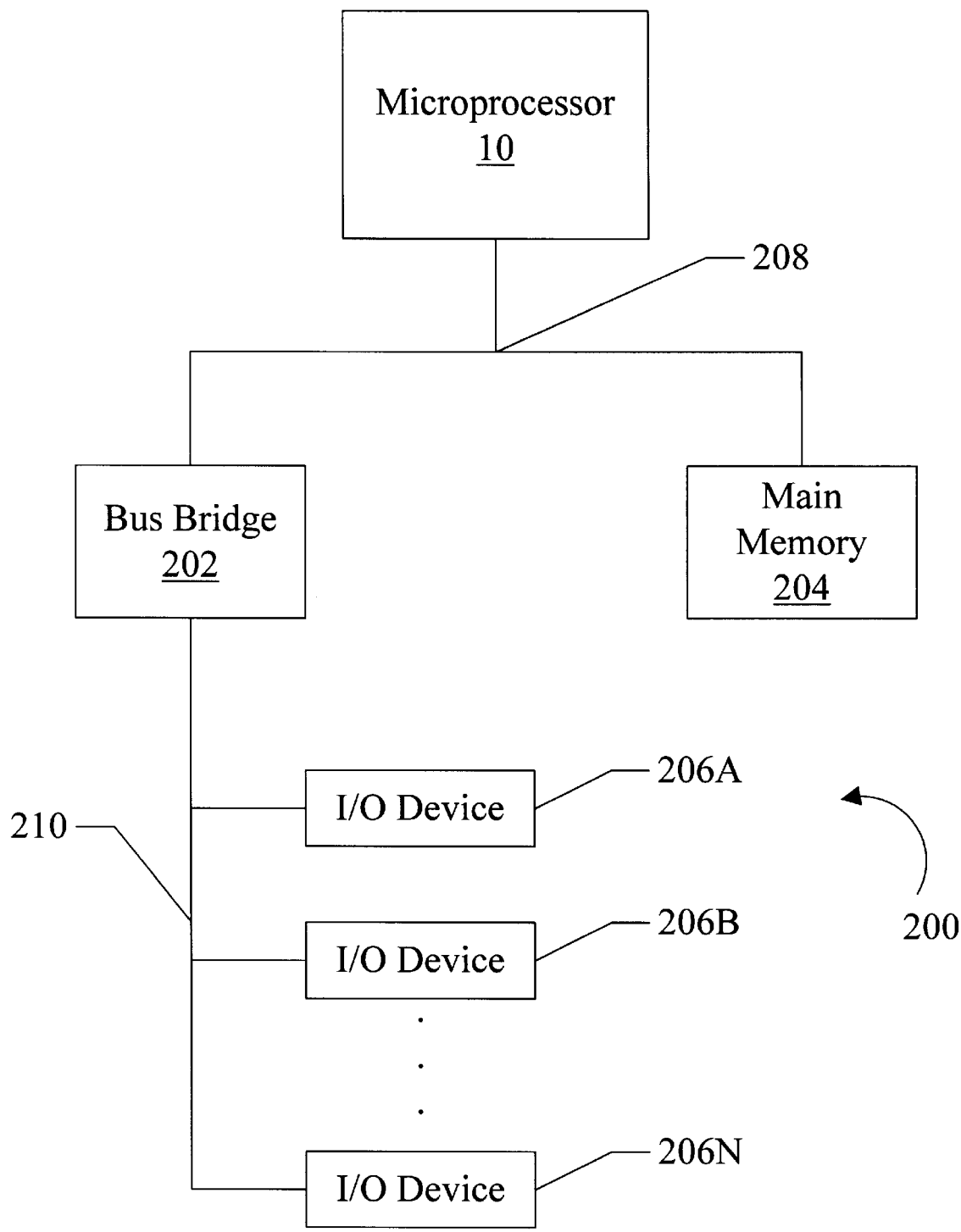
FIG. 10 is a block diagram of one embodiment of a computer system including the microprocessor shown in FIG. 1.

Turning now to FIG. 10, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 10 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is noted that instructions are considered to be dispatching when the instructions are presented to the reorder buffer for dependency checking and storage. Instructions are said to be "outstanding" within the instruction processing pipeline of microprocessor 10 from the clock cycle in which the instructions are dispatched and the clock cycle in which the instructions are retired to register file 30. It is further noted that the LIB encodings as shown herein for an embodiment of the x86 microprocessor architecture may be expanded to indicate additional register portions as desired. Furthermore, the LIB indication may comprise a single bit in embodiments of microprocessor 10 which do not allow update of a portion of a register. Still further, although microprocessor 10 is described above in various embodiments as employing the x86 microprocessor architecture, microprocessor 10 may employ any microprocessor architecture according to various embodiments.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid it indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |

TABLE 1-continued x86 Fast Path, Double Dispatch, and MROM Instructions

| X86 Instruction | Instruction Category |
|---|---|
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al, now abandoned. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran, U.S. Pat. No. 5,619,464 issued Apr. 18, 1987. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt, now abandoned; "Superscalar Microprocessor Including a High Performance Instruction Alignment Unit", Ser. No. 08/377,843, filed Jan. 25, 1995 by Witt, et al, now abandoned; "A Way Prediction Structure", Ser. No. 08/522,181, filed Aug. 31, 1995 by Roberts, et al, now abandoned; "A Data Cache Capable of Performing Store Accesses in a Single Clock Cycle", Ser. No. 08/521,627, filed Aug. 31, 1995, U.S. Pat. No. 5,860,104 issued Jan. 12, 1999 to Witt, et al; "A Parallel and Scalable Instruction Scanning Unit", Ser. No. 08/475,400, filed Jun. 7, 1995, U.S. Pat. No. 5,853,517 issued Dec. 29, 1998 to Narayan; and "An Apparatus and Method for Aligning Variable-Byte Length Instructions to a Plurality of Issue Positions", Ser. No. 08/582,473, filed Jan. 2, 1996, U.S. Pat. No. 5,822,559 issued Oct. 13, 1998 to Tran, et al. The disclosure of these patent applications are incorporated herein by reference in their entirety.

In accordance with the above disclosure, a reorder buffer has been described which includes LIB indications for simplifying dependency checking by identifying a dependency upon at most one instruction represented within the buffer. Dependency checking complexity may be reduced by the removal of prioritization logic needed when multiple dependencies are identified. Additionally, the reorder buffer stores LIL indications which serve as write enables for retirement of multiple instructions which update the same register.

Numerous variations and modifications will become apparent to those skilled in the art once the above disclosure is fully appreciated. It is intended that the following claims be interpreted to embrace all such variations and modifications.

What is claimed is:

1. A microprocessor comprising:

a register file including a plurality of registers; and a reorder buffer coupled to said register file, said reorder buffer including a plurality of lines of storage, wherein each of said plurality of lines of storage is configured to store information corresponding to up to a predefined maximum number of instructions that are concurrently retireable, said predefined maximum number of instructions being greater than one, and wherein said reorder buffer is configured to concurrently retire instructions represented within a first line of said plurality of lines of storage, and wherein said first line is configured to store a first last-in-line (LIL) indication corresponding to a first instruction represented in said first line, and wherein said first LIL indication is indicative of whether or not said first instruction represented in said first line is last, in program order, among said instructions represented within said first line to have a first register in said register file as a destination, and wherein said reorder buffer is configured to selectively update said first register in said register file with a first result of executing said first instruction responsive to said first LIL indication.

2. The microprocessor as recited in claim 1 where said reorder buffer is configured to update said first register with said first result responsive to said first LIL indication indicating that said first instruction is last, in program order, among said instructions represented within said first line to have said first register as said destination.

3. The microprocessor as recited in claim 1 where said reorder buffer is configured to inhibit update of said first register with said first result responsive to said first LIL indication indicating that said first instruction is not last, in program order, among said instructions represented within said first line to have said first register as said destination.

4. The microprocessor as recited in claim 1 wherein said first register includes two or more portions, and wherein instructions are codable with one or more of said portions of said first register as said destination, and wherein said first LIL indication includes two or more indications, each of said two or more indications corresponding to a respective one of said two or more portions.

5. The microprocessor as recited in claim 4 wherein said reorder buffer is configured to selectively update each of said two or more portion of said first register responsive to said two or more indications.

6. The microprocessor as recited in claim 1 wherein said first line is configured to store a second LIL indication corresponding to a second instruction which is subsequent to said first instruction in program order.

7. The microprocessor as recited in claim 6 wherein, if said second instruction has said first register as a destination, said first LIL indication indicates that said first instruction is not last, in program order, to have said first register as a destination.

8. The microprocessor as recited in claim 6 wherein said first register includes two or more portions, and wherein instructions are codable with one or more of said portions of said first register as said destination, and wherein said first LIL indication includes two or more indications, each of said two or more indications corresponding to a respective one of said two or more portions, and wherein said second LIL indication includes two or more indications, each of said two or more indications corresponding to a respective one of said two or more portions.

9. The microprocessor as recited in claim 8 each of said two or more indications of said second LIL indication which correspond to portions updated in response to said second instruction indicate that said second instruction is last, in program order, to have said portions as said destination.

10. The microprocessor as recited in claim 9 wherein each of said two or more indications of said first LIL indication which correspond to portions updated in response to said first instruction and updated in response to said second instruction indicate that said first instruction is not last, in program order, to have said portions as said destination.

11. The microprocessor as recited in claim 10 wherein each of said two or more indications of said first LIL indication which correspond to portions updated in response to said first instruction and not updated in response to said second instruction indicate that said first instruction is last, in program order, to have said portions as said destination.

12. The microprocessor as recited in claim 1 wherein said predefined maximum number of instructions is a maximum number of concurrently dispatchable instructions within said microprocessor.

13. A computer system comprising:

a microprocessor comprising:

a register file including a plurality of registers; and a reorder buffer coupled to said register file, said reorder buffer including a plurality of lines of storage, wherein each of said plurality of lines of storage is configured to store information corresponding to up to a predefined maximum number of instructions that are concurrently retireable, said predefined maximum number of instructions being greater than one, and wherein said reorder buffer is configured to concurrently retire instructions represented within a first line of said plurality of lines of storage, and wherein said first line is configured to store a first last-in-line (LIL) indication corresponding to a first instruction represented in said first line, and wherein said first LIL indication is indicative of whether or not said first instruction represented in said first line is last, in program order, among said instructions represented within said first line to have a first register in said register file as a destination, and wherein said reorder buffer is configured to selectively update said first register in said register file with a first result of executing said first instruction responsive to said first LIL indication; and an input/output (I/O) device configured to communicate between said computer system and another computer system to which said I/O device is capable of being coupled.

14. The computer system as recited in claim 13 wherein said I/O device is a modem.

15. The computer system as recited in claim 13 further comprising an audio I/O device.

16. The computer system as recited in claim 15 wherein said audio I/O device comprises a sound card.

17. A method for operating a reorder buffer comprising:

storing a first last-in-line (LIL) indication corresponding to a first instruction in a first line of storage in said reorder buffer, said first line of storage configured to store information corresponding to up to a predefined maximum number of instructions that are concurrently retireable, said predefined maximum number of instructions being greater than one, wherein said first LIL indication is indicative of whether or not said first instruction represented in said first line is last, in program order, among instructions represented within said first line of storage to have a first register in said register file as a destination;

concurrently retiring instructions within said first line of storage; and selectively updating said first register in said register file with a first result of executing said first instruction responsive to said first LIL indication.

18. The method as recited in claim 17 wherein said selectively updating comprises updating said first register if said first LIL indication indicates that said first instruction is last, in program order, among instructions represented within said first line of storage to have said first register as said destination.

19. The method as recited in claim 17 wherein said selectively updating comprises not updating said first register if said first LIL indication indicates that said first instruction is not last, in program order, among instructions represented within said first line of storage to have said first register as said destination.

20. The method as recited in claim 17 wherein said first register includes two or more portions, and wherein instructions are codable with one or more of said portions of said first register as said destination, and wherein said first LIL indication includes two or more indications, each of said two or more indications corresponding to a respective one of said two or more portions, and wherein said selectively updating comprises:

selectively updating a first portion of said two or more portions responsive to a first indication of said two or more indications; and selectively updating a second portion of said two or more portions responsive to a second indication of said two or more indications.

* * * * *